(12) United States Patent
Jeong

(10) Patent No.: US 8,588,345 B1
(45) Date of Patent: Nov. 19, 2013

(54) ORTHOGONAL FREQUENCY DIVISION MULTIPLEXING RECEIVER

(75) Inventor: Junyoung Jeong, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1172 days.

(21) Appl. No.: 12/488,844

(22) Filed: Jun. 22, 2009

(51) Int. Cl.
*H04L 27/08* (2006.01)

(52) U.S. Cl.
USPC ........... 375/340; 375/354; 375/355; 375/362; 375/364; 375/365; 375/366; 375/368; 375/260; 348/425.4; 348/436.1; 348/460; 348/464; 348/500; 348/513; 348/521; 348/525; 348/725; 348/726

(58) Field of Classification Search
USPC ......... 375/354, 355, 362, 364, 365, 366, 368, 375/260; 348/425.4, 436.1, 460, 464, 500, 348/513, 521, 525, 725, 726
See application file for complete search history.

(56) References Cited

U.S. PATENT DOCUMENTS

| | | | | |
|---|---|---|---|---|
| 6,810,007 | B1 * | 10/2004 | Kim | 370/208 |
| 2005/0251844 | A1 * | 11/2005 | Martone et al. | 725/118 |
| 2006/0114812 | A1 * | 6/2006 | Kim et al. | 370/206 |
| 2007/0041348 | A1 * | 2/2007 | Kwun et al. | 370/335 |

FOREIGN PATENT DOCUMENTS

| | | |
|---|---|---|
| KR | 1020010105898 | 11/2001 |
| KR | 1020020089793 | 11/2002 |
| KR | 1020070061217 | 6/2007 |
| KR | 1020070087449 | 8/2007 |

OTHER PUBLICATIONS

English Abstract for Publication No. 1020010105898, Nov. 29, 2001; pp. 1-14, authors Cho et al.
English Abstract for Publication No. 1020020089793, Nov. 30, 2002; pp. 1-11, authors Kim et al.
English Abstract for Publication No. 1020070061217, Jun. 13, 2007; pp. 1-18 authors Lee et al.
English Abstract for Publication No. 1020070087449, Aug. 28, 2007; pp. 1-13, authors Chang et al.

* cited by examiner

*Primary Examiner* — Daniel Washburn
*Assistant Examiner* — Rahel Guarino
(74) *Attorney, Agent, or Firm* — F. Chau & Associates, LLC

(57) ABSTRACT

Provided is an OFDM receiver which extracts a time sync signal from a prefix having a symmetric structure. The OFDM receiver, according to exemplary embodiments of the present invention, generates the sync signal (e.g., start point) of a symbol by using only the MSB (e.g., sign bit) of the cyclic prefix of an OFDM symbol, reducing the overhead of a logic circuit for generating the sync signal of the symbol.

19 Claims, 10 Drawing Sheets

ORTHOGONAL FREQUENCY DIVISION MULTIPLEXING RECEIVER

BACKGROUND OF THE INVENTION

1. Technical Field

The present invention relates to a receiver, and more particularly, to an orthogonal frequency division multiplexing (OFDM) receiver.

2. Discussion of the Related Art

In general, an OFDM receiver is used to receive digital broadcasting that has been transmitted in accordance with an OFDM scheme. OFDM schemes provide for conducting frequency-division multiplexing (FDM) as a digital multi-carrier modulation method. In a communication system conforming to an OFDM scheme, a sync signal is provided between a transmitter and a receiver for establishing frequency synchronization therebetween.

OFDM requires very accurate frequency synchronization between the receiver and the transmitter. If the frequencies of the receiver and transmitter deviate, sub-carriers may no longer be orthogonal and inter-carrier interference (ICI), i.e. cross-talk between the sub-carriers, may develop.

OFDM reception may be used to receive digitally transmitted image data, such as digital television data.

SUMMARY OF THE INVENTION

Exemplary embodiments of the present invention provide an Orthogonal Frequency Division Multiplexing (OFDM) receiver, which provides for a time sync signal within a symbol.

Exemplary embodiments of the present invention provide an OFDM receiver including a plurality of symbols, each having data and a prefix, and a symbol synchronizer generating a time sync signal of the data from the prefix. The prefix includes a plurality of complex numbers, and the symbol synchronizer generates the time sync signal by using sign bits of the complex numbers.

In some exemplary embodiments, the data includes image data received through digital broadcasting.

In some exemplary embodiments, the complex numbers include a real part and an imaginary part, and the symbol synchronizer generates the time sync signal by using the sign bit of the imaginary part.

In some exemplary embodiments, a first symbol of the plurality of symbols sequentially includes a first prefix, first data and another instance of the first prefix.

In some exemplary embodiments, a second symbol of the symbols sequentially includes a second prefix, second data and another instance of the second prefix, wherein the first and second prefixes are symmetrical.

In some exemplary embodiments, the symbol synchronizer multiplies the sign bits of the imaginary parts of the complex numbers which are included in the first prefix and the sign bits (which are symmetrical with respect to the sign bits in the first prefix) of the imaginary parts of the complex numbers which are included in the second prefix, and sums the multiplication results to output correlation.

BRIEF DESCRIPTION OF THE FIGURES

The accompanying figures illustrate exemplary embodiments of the present invention and, together with the description, serve to explain principles of the present invention. In the figures.

DETAILED DESCRIPTION OF EXEMPLARY EMBODIMENTS

Exemplary embodiments of the present invention will be described below in more detail with reference to the accompanying drawings. The present invention may, however, be embodied in different forms and should not be construed as limited to the embodiments set forth herein.

Hereinafter, exemplary embodiments of the present invention will be described in detail below with reference to the accompanying drawings.

Figure 1:
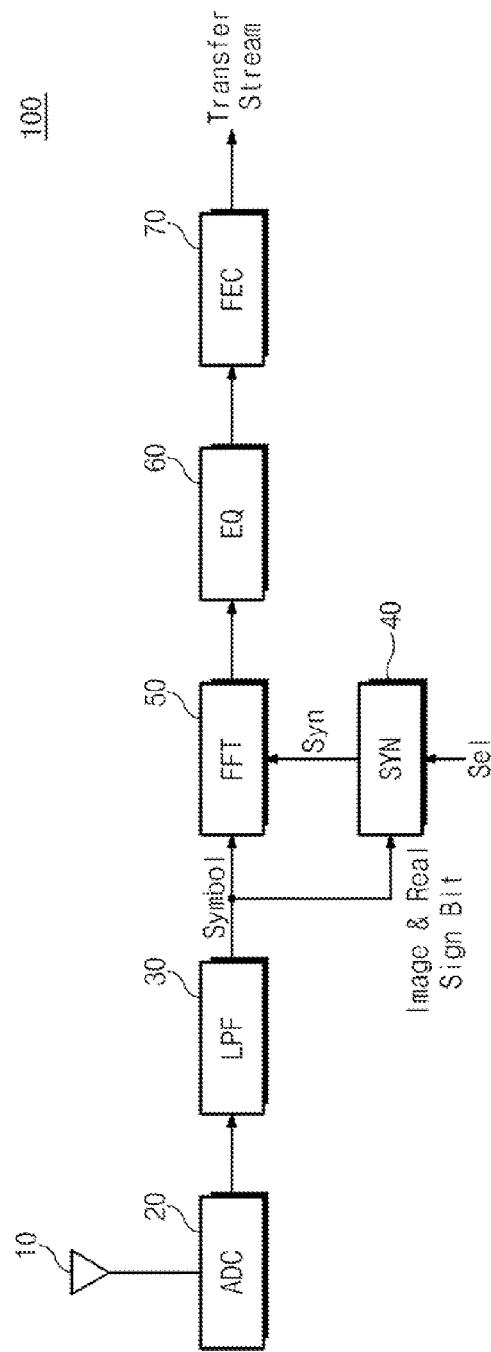
FIG. 1 is a block diagram illustrating an Orthogonal Frequency Division Multiplexing (OFDM) receiver according to an exemplary embodiment of the present invention.

FIG. 1 is a block diagram illustrating an Orthogonal Frequency Division Multiplexing (OFDM) receiver according to an exemplary embodiment of the present invention.

Referring to FIG. 1, an OFDM receiver 100 according to an exemplary embodiment of the present invention includes an antenna 10, an analog-to-digital converter (ADC) 20, a low-pass filter (LPF) 30, a symbol synchronizer (SYN) 40, a fast Fourier transformer (FFT) 50, an equalizer (EQ) 60, and a forward error corrector (FEC) 70.

The antenna 10 receives an OFDM signal. The ADC 20 converts the OFDM signal received through the antenna 10 into a digital signal.

The LPF 30 permits only a desired frequency band of the converted received digital OFDM signal to pass, and the desired frequency band of the converted received digital OFDM signal is used to generate a symbol signal Symbol.

A symbol, according to an exemplary embodiment of the present invention, includes image data and a prefix (or preamble) signal that includes the time sync signal of the image data. The time sync signal establishes the start point of the image data. The symbol will be described in detail below with reference to FIG. 2.

Figure 2:
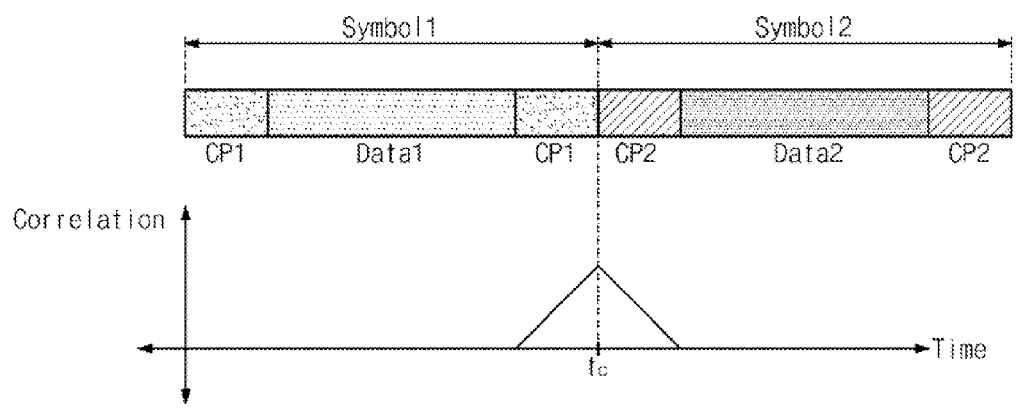
FIG. 2 is a graph illustrating the conception and correlation of a symbol in FIG. 1.

FIG. 2 is a graph illustrating the conception and correlation of the symbol of FIG. 1.

Referring to FIG. 2, a first symbol Symbol1 sequentially includes a first cyclic prefix CP1, first data Data1 and another instance of first cyclic prefix CP1. The second symbol Symbol2 sequentially includes a second cyclic prefix CP2, second data Data2 and another instance of the second cyclic prefix CP2.

The first and second data Data1 and Data2 include image data. The first and second cyclic prefixes CP1 and CP2 include the time sync information of the first and second data Data1 and Data2.

By multiplying the first symbol Symbol1 and the second symbol Symbol2, correlation is calculated. The time $t_c$ of the highest point in the correlation represents the time synchronization of the first and second symbols Symbol1 and Symbol2.

The first and second cyclic prefixes CP1 and CP2 are configured in a complex conjugation structure. The real parts of the first and second cyclic prefixes CP1 and CP2 are bilaterally symmetrical, and the imaginary parts of the first and second cyclic prefixes CP1 and CP2 are symmetrical about the origin. The first and second cyclic prefixes CP1 and CP2 will be described in detail below with reference to FIG. 3.

Figure 3:
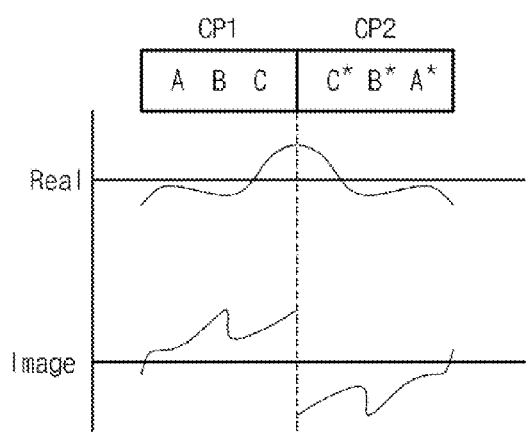
FIG. 3 is a conceptual view illustrating first and second cyclic prefixes in FIG. 2.

FIG. 3 is a conceptual view illustrating the first and second cyclic prefixes of FIG. 2.

Referring to FIG. 3, the first and second cyclic prefixes CP1 and CP2 are configured with complex numbers. The first cyclic prefix CP1 includes a plurality of complex numbers A, B and C. The second cyclic prefix CP2 includes a plurality of complex numbers C*, B* and A*.

In FIG. 3, the real parts of the complex numbers A, B and C and the real parts of the complex numbers C*, B* and A* are laterally symmetrical. The imaginary parts of the complex numbers A, B and C and the imaginary parts of the complex numbers C*, B* and A* are symmetrical about the origin. For example, when the complex number A is expressed as "a+jb", the complex number A* may be expressed as "a−jb".

Returning to FIG. 1, the symbol is configured with the prefix and the data, and the prefix is configured with the plurality of complex numbers, as shown in FIGS. 2 and 3.

The symbol synchronizer 40 receives the sign bits of the real and imaginary parts of the complex numbers to generate a symbol sync signal Syn. The symbol sync signal Syn includes the time sync information on the image data of the symbol. The sign bit of the real part is configured with the most significant bit (MSB) of the real part of the complex number. The sign bit of the imaginary part is configured with the MSB of the imaginary part of the complex number.

Moreover, the user of the OFDM receiver according to an exemplary embodiment of the present invention externally inputs a selection signal Sel, and determines whether the symbol synchronizer 40 uses only the sign bit of the imaginary part or uses the sign bits of the real and imaginary parts.

The structure of the symbol synchronizer 40 and a process for generating the symbol sync signal according to an exemplary embodiment of the present invention will be described in detail below with reference to FIG. 8.

The cyclic prefix of the symbol includes a plurality of complex numbers. Moreover, as shown in FIGS. 2 and 3, the complex numbers are configured in a symmetric structure. The symbol synchronizer 40 calculates the correlation by using the MSBs (i.e., sign bits) of the complex numbers having a symmetric structure. Time information on the highest point of the correlation is a time sync signal.

A method for calculating the correlation from the prefix will be described in detail below with reference to FIGS. 4 to 7.

Figure 4:
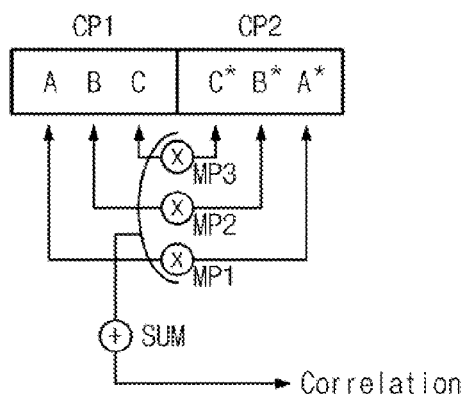
FIG. 4 is a block diagram illustrating a circuit for calculating the correlation from the first and second cyclic prefixes in FIG. 3.

FIG. 4 is a block diagram illustrating a circuit for calculating the correlation from the first and second cyclic prefixes in FIG. 3.

Referring to FIGS. 1 to 4, the first cyclic prefix CP1 sequentially includes the complex numbers A, B and C. The second cyclic prefix CP2 sequentially includes the complex numbers C*, B* and A*.

For example, the symbol synchronizer 40 sequentially receives the first symbol Symbol1 and the second symbol Symbol2. The symbol synchronizer 40 stores the first cyclic prefix CP1 of the first-inputted first symbol Symbol1. The symbol synchronizer 40 multiplies the stored first cyclic prefix CP1 and the second cyclic prefix CP2 of the next-inputted second symbol Symbol2 in input order to establish correlation.

In this case, when the first and second cyclic prefixes CP1 and CP2 are symmetrical, the correlation is highest. For example, as illustrated in FIG. 4, a first multiplier MP1 multiplies the complex numbers A and A*, and transfers the multiplication result to an adder SUM. A second multiplier MP2 multiplies the complex numbers B and B*, and transfers the multiplication result to the adder SUM. A third multiplier MP3 multiplies the complex numbers C and C*, and transfers the multiplication result to the adder SUM. The adder SUM sums the multiplication results of the first to third multipliers MP1 to MP3, and outputs the sum result. The output of the adder SUM represents the correlation. The correlation will be described in detail below with reference to FIG. 5.

Figure 5:
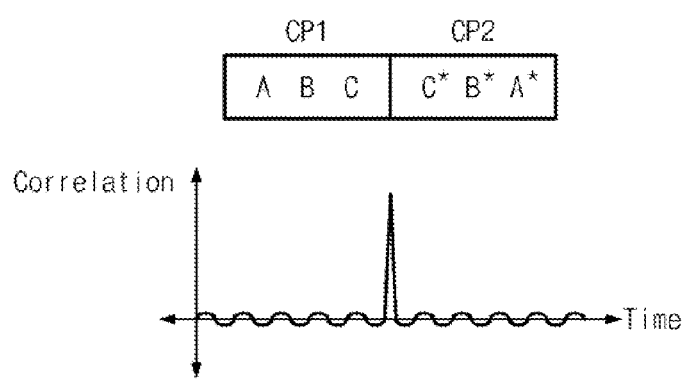
FIG. 5 is a timing diagram illustrating the sum result of an adder in FIG. 4.

FIG. 5 is a timing diagram illustrating the sum result of the adder in FIG. 4.

Referring to FIGS. 4 and 5, the correlation is highest at a point about which the first and second cyclic prefixes CP1 and CP2 are symmetrical. The time at which the correlation is at its highest is the synchronization time for the first and second symbols Symbol1 and Symbol2. In an ideal case, a peak correlation emerges at an accurate symmetric time, and the correlation is '0' at sections other than a symmetric section.

Moreover, when the cyclic prefix is configured in a dual-symmetric structure, a plurality of peaks may emerge. The cyclic prefix having the dual-symmetric structure will be described in detail below with reference to FIGS. 6 and 7.

Figure 6:
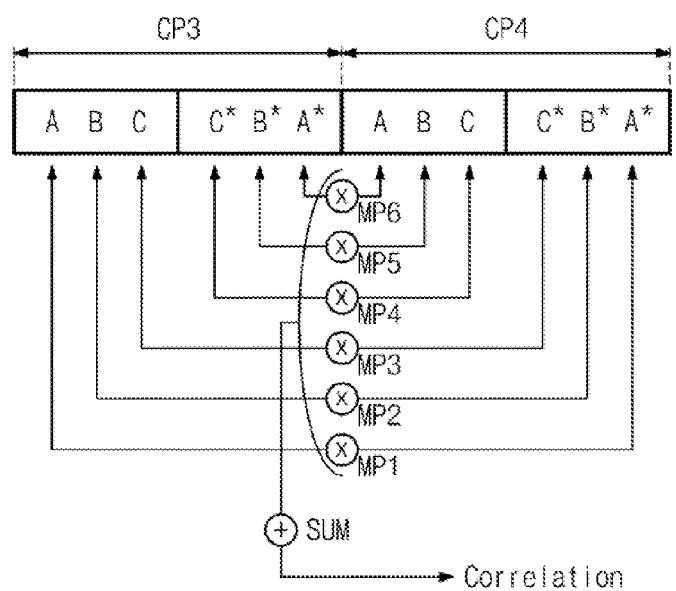
FIG. 6 is a block diagram illustrating a circuit for calculating the correlation from the cyclic prefix having a dual-symmetric structure.

FIG. 6 is a block diagram illustrating a circuit for calculating the correlation from the cyclic prefix having the dual-symmetric structure.

Referring to FIGS. 1 and 6, a third cyclic prefix CP3 sequentially includes the complex numbers A, B, C, C*, B* and A*. A fourth cyclic prefix CP4 sequentially includes the complex numbers A, B, C, C*, B* and A*.

The symbol synchronizer 40 sequentially receives a third symbol Symbol3 and a fourth symbol Symbol4. The symbol synchronizer 40 stores the first-inputted third cyclic prefix CP3. The symbol synchronizer 40 multiplies the stored third cyclic prefix CP3 and the fourth cyclic prefix CP4 of the next-inputted fourth symbol Symbol4 in input order to establish correlation.

A first multiplier MP1 multiplies the complex numbers A and A*, and transfers the multiplication result to an adder SUM. A second multiplier MP2 multiplies the complex numbers B and B*, and transfers the multiplication result to the adder SUM. A third multiplier MP3 multiplies the complex numbers C and C*, and transfers the multiplication result to the adder SUM. A fourth multiplier MP4 multiplies the complex numbers C and C*, and transfers the multiplication result to the adder SUM. A fifth multiplier MP5 multiplies the complex numbers B and B*, and transfers the multiplication result to the adder SUM. A sixth multiplier MP6 multiplies the complex numbers A and A*, and transfers the multiplication result to the adder SUM. The adder SUM sums the multiplication results of the first to sixth multipliers MP1 to MP6, and outputs the sum result. The output of the adder SUM represents the correlation. The correlation will be described in detail below with reference to FIG. 7.

Figure 7:
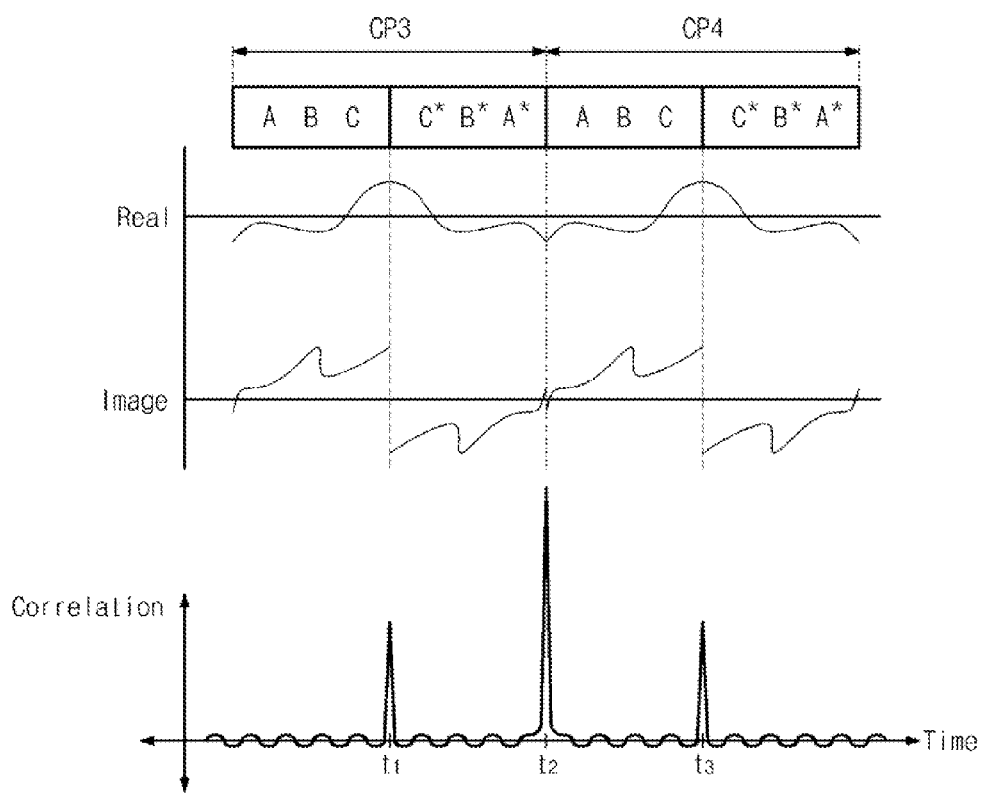
FIG. 7 is a timing diagram illustrating the conception of the cyclic prefix and the sum result of an adder in FIG. 6.

FIG. 7 is a timing diagram illustrating the conception of the cyclic prefix and the sum result of the adder in FIG. 6.

Referring to FIGS. 6 and 7, a peak emerges at a point about which the third and fourth cyclic prefixes CP3 and CP4 are symmetrical. The third and fourth cyclic prefixes CP3 and CP4 are dually symmetrical. Accordingly, a peak emerges at each point about which the third and fourth cyclic prefixes CP3 and CP4 are symmetrical.

Symmetric points are at times t1 to t3, respectively. For example, a first peak P1 emerges at the time t1. A second peak P2 emerges at the time t2. A third peak P3 emerges at the time t3.

At the time t1, the complex numbers A, B and C and the complex numbers C*, B* and A* are symmetrical. At the time t2, the complex numbers A, B, C, C*, B* and A* and the complex numbers A, B, C, C*, B* and A* are symmetrical. At the time t3, the complex numbers A, B and C and the complex numbers C*, B* and A* are symmetrical.

At the times t1 and t3, since the three complex numbers are symmetrical, small peaks emerge. At the time t2, since the six complex numbers are symmetrical, a large peak emerges. In this case, the time t2 when the large peak emerges is the time sync point of the third and fourth cyclic prefixes CP3 and CP4.

Generally, a cyclic prefix includes the time sync signal of image data. The time sync signal of the image data is configured with a plurality of complex numbers. In a method for calculating the time sync signal according to an exemplary embodiment of the present invention, the time sync signal is generated by using the sign bits (which are MSBs) of the imaginary parts of the complex numbers or the sign bits (which are MSBs) of the real and imaginary parts of the complex numbers.

For example, it is assumed that the first cyclic prefix signal is configured with the complex number A (which is expressed as "a+jb"), and the second cyclic prefix signal is configured with the complex number A* (which is expressed as "a−jb").

The real part of the complex number A is 'a', and the imaginary part of the complex number A is 'b'. The real part of the complex number A* is 'a', and the imaginary part of the complex number A* is '−b'.

The multiplication result of the imaginary parts of the complex numbers A and A* is a negative real number. The multiplication result of the real parts of the complex numbers A and A* is a positive real number. The multiplication result of the real parts of the complex numbers A and A* is inverted, and the inverted multiplication result is added to the multiplication result of the imaginary parts of the complex numbers A and A*.

The method for calculating the time sync signal according to an exemplary embodiment of the present invention may use only the imaginary part, and may use both the real part and the imaginary part.

A method for calculating time synchronization with only the imaginary part will be described in detail below with reference to FIG. 9. A method for calculating time synchronization with the real and imaginary parts, moreover, will be described in detail below with reference to FIG. 10.

The cyclic prefix according to an exemplary embodiment of the present invention includes a plurality of complex numbers, and thus, all the sign bits of the imaginary parts of the complex numbers are multiplied. When a sufficient number of complex numbers have been multiplied, there may be a high correlation to a point about which the complex numbers are symmetrical.

Returning to FIG. 1, the FFT 50 performs fast Fourier transform by using the symbol transferred from the LPF 30 and the symbol sync signal Syn transferred from the symbol synchronizer 40.

The equalizer 60 controls the frequency band of a fast Fourier transformed OFDM receipt signal to uniformly distribute the frequency band. The FEC 70 corrects an error occurring in the equalized OFDM receipt signal to output a transfer stream. The transfer stream is decoded according to an encoded codec and the transfer stream is converted into image data.

According to exemplary embodiments of the present invention, the OFDM receiver uses only the sign bit of the complex number constituting the prefix, and thus, can reduce the overhead of the hardware for calculating the correlation. Moreover, the OFDM receiver calculates only the sign bit and thus can reduce the computational resources needed to extract a fast time sync signal.

Hereinafter, the structure of the symbol synchronizer 40 and a process for generating the symbol sync signal will be described.

Referring to FIGS. 1 to 8, the symbol synchronizer 40 includes an imaginary correlation outputter 41, an imaginary/real correlation outputter 42, a first multiplexer 43, a second multiplexer 44, a subtractor 45, an absolute value converter 46, an average filter 47, and a maximum value extractor 48.

The imaginary correlation outputter 41 receives only the sign bits of the imaginary parts of the complex numbers which are included in the cyclic prefix. The imaginary correlation outputter 41 multiplies the sign bits of the imaginary parts of the complex numbers and sums the multiplication results. The sum result is represented as the correlation. The imaginary correlation outputter 41 will be described in detail below with reference to FIG. 9.

Figure 8:
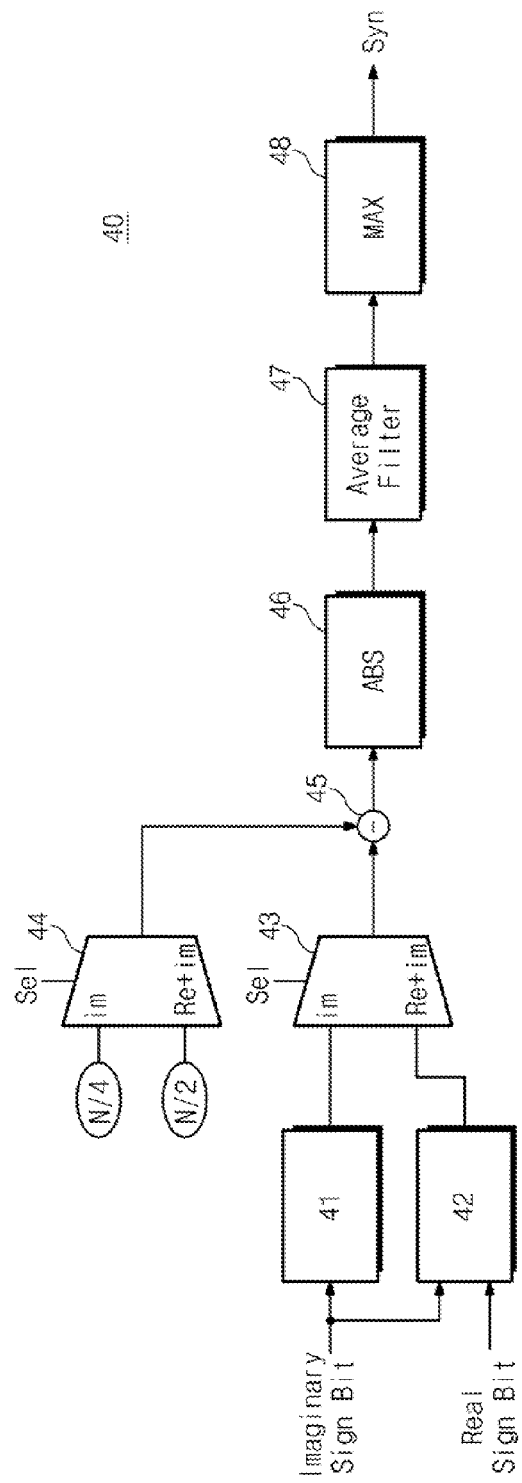
FIG. 8 is a block diagram illustrating a structure of a symbol synchronizer and a process for generating a symbol sync signal according to an exemplary embodiment of the present invention.
Figure 9:
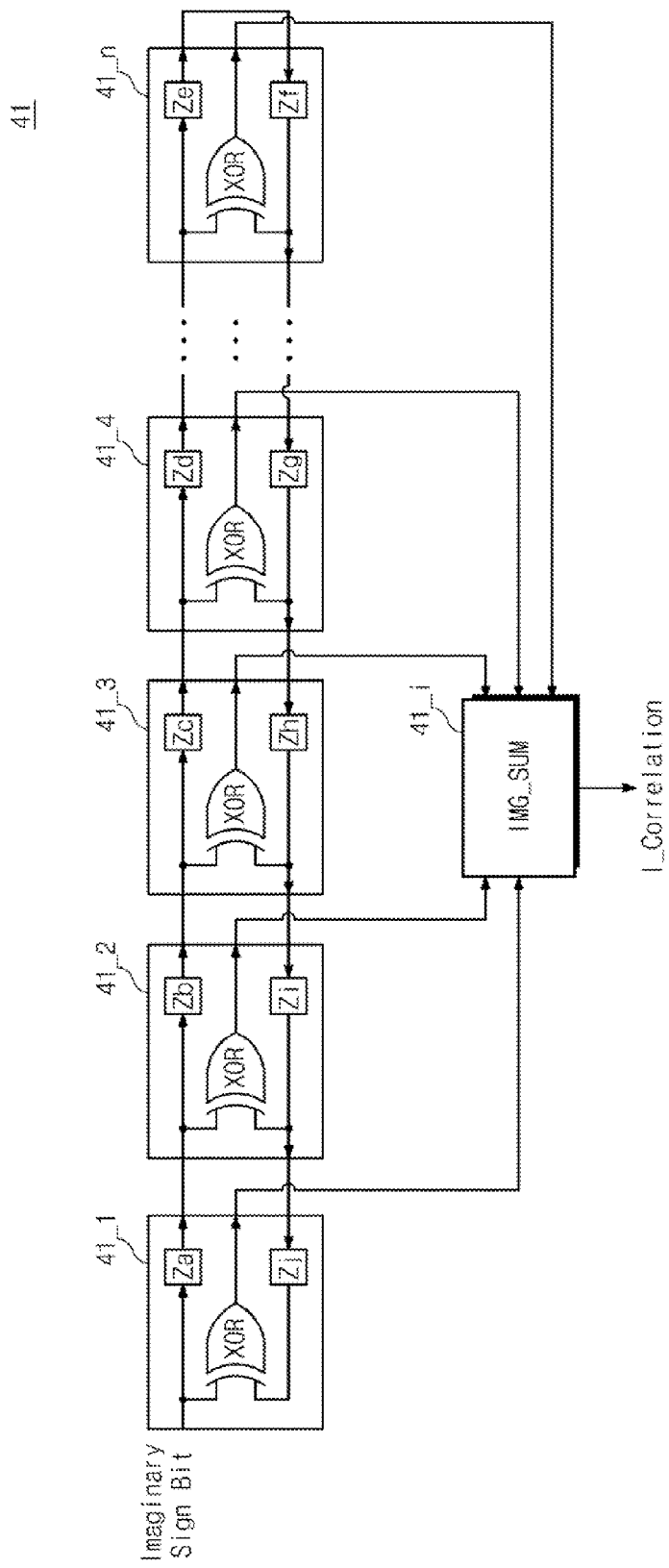
FIG. 9 is a block diagram illustrating in detail the imaginary part correlation outputter in FIG. 8.

FIG. 9 is a block diagram illustrating in detail the imaginary correlation outputter in FIG. 8.

Referring to FIG. 9, the imaginary correlation outputter 41 includes first to $n^{th}$ imaginary sign bit multipliers 41_1 to 41_n (41_1. 41_2, 41_3, 41_4, ..., 41_n) and an imaginary adder 41_i.

The first to $n^{th}$ imaginary sign bit multipliers 41_1 to 41_n have the same structure and operation principle. Accordingly, the description of the first imaginary sign multiplier 41_1 will be applied to the second to $n^{th}$ imaginary sign bit multipliers 41_2 to 41_n.

The first imaginary sign bit multiplier 41_1 includes two registers Za and Zj, and one XOR gate.

The register Za receives the sign bit of the imaginary part and shifts the sign bit of the imaginary part to the register Zb. The register Za transfers the sign bit of the imaginary part to the XOR gate. The register Zi shifts the sign bit of the imaginary part to the register Zj. The register Zj transfers a stored sign bit to the XOR gate.

The registers Za to Zj are configured with a shift register for shifting the sign bit of the imaginary part. For example, the register Za of the first imaginary sign bit multiplier 41_1 shifts the sign bit of the imaginary part to the register Zb of the second imaginary sign bit multiplier 41_2. The register Zb of the second imaginary sign bit multiplier 41_2 shifts the sign bit of the imaginary part to the register Zc of the third imaginary sign bit multiplier 41_3. The register Zc of the third imaginary sign bit multiplier 41_3 shifts the sign bit of the imaginary part to the register Zd of the fourth imaginary sign bit multiplier 41_4. Subsequently, the register Ze of the $n^{th}$ imaginary sign bit multiplier 41_n shifts the sign bit of the imaginary part to the register Zf.

While the registers Za and Zj shift the sign bit of the imaginary part, the XOR gate of the first imaginary sign bit multiplier 41_1 performs an XOR operation on the sign bit of the imaginary part transferred from the register Za and the sign bit of the imaginary part transferred from the register Zj. The XOR gate transfers the XOR-operation result to the imaginary adder 41_i. The imaginary adder 41_i sums all the XOR-operation results of the XOR gates of the first to $n^{th}$ imaginary sign bit multipliers 41_1 to 41_n to output the correlation I_Correlation of the sign bit of the imaginary part.

The operation of the first imaginary sign bit multiplier 41_1 will be described in detail below with reference to FIGS. 10 to 12.

Figure 10:
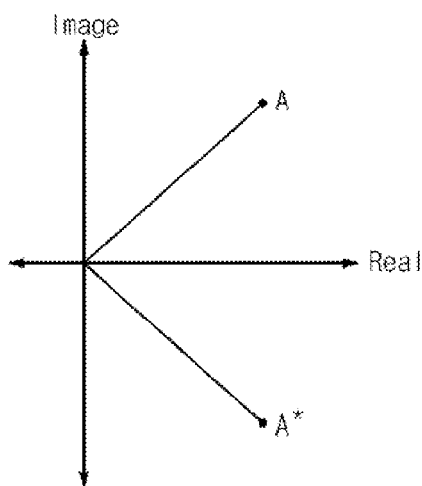
FIGS. 10 to 12 are graphs illustrating a complex number inputted to a symbol synchronizer in FIG. 9.

FIG. 10 illustrates a case where the state of the broadcasting receipt channel is normal. FIGS. 11 and 12 illustrate a case where the state of the broadcasting receipt channel is abnormal.

Figure 11:
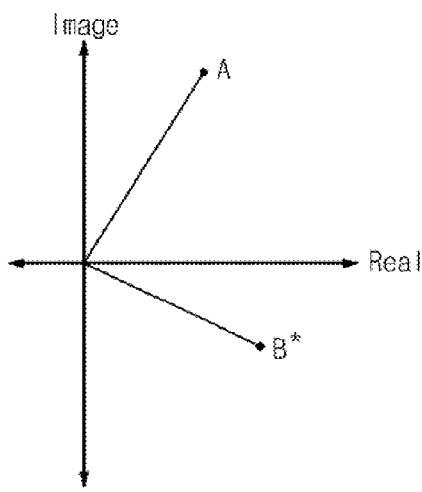
Figure 12:
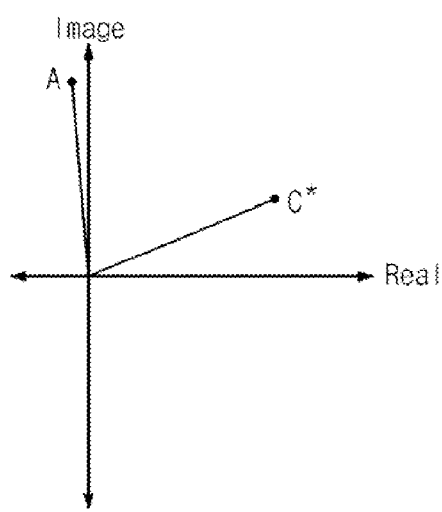

FIGS. 10 to 12 are graphs illustrating the complex number inputted to the symbol synchronizer in FIG. 9. In the graphs of FIGS. 10 to 12, an X axis is a real part, and a Y axis is an imaginary part.

Referring to FIG. 10, it is assumed that the complex number A is "a+jb" and the complex number A* is "a−jb". The real part of the complex number A is 'a', and the imaginary part of the complex number A is 'b'. The real part of the complex number A* is 'a', and the imaginary part of the complex number A* is '−b'. The complex numbers A and A* are symmetrical about an X axis. In this case, the sign bit of the imaginary part of the complex number A is positive, and the sign bit of the imaginary part of the complex number A* is negative.

Referring to FIGS. 9 and 10, the register Za of the first imaginary sign bit multiplier 41_1 receives the sign bit of the imaginary part of the complex number A. The register Zj of the first imaginary sign bit multiplier 41_1 transfers the sign bit of the imaginary part of the complex number A* to the register Zi.

The XOR gate of the first imaginary sign bit multiplier 41_1 performs an XOR operation on a positive sign bit transferred from the register Za and a negative sign bit transferred from the register Zj to output a negative value.

In FIG. 11, the complex number A* is changed to the complex number B* due to an abnormal broadcasting receipt channel.

Referring to FIG. 11, it is assumed that the complex number A is "a+jb" and the complex number B* is "c−jd". The real part of the complex number A is 'a', and the imaginary part of the complex number A is '1D'. The real part of the complex number B* is 'c', and the imaginary part of the complex number B* is '−d'. In this case, the sign bit of the imaginary part of the complex number A is positive, and the sign bit of the imaginary part of the complex number B* is negative.

Referring to FIGS. 9 and 11, the register Za of the first imaginary sign bit multiplier 41_1 receives the sign bit of the imaginary part of the complex number A. The register Zj of the first imaginary sign bit multiplier 41_1 receives the sign bit of the imaginary part of the complex number B* from the register Zi. The XOR gate of the first imaginary sign bit multiplier 41_1 performs an XOR operation on a positive sign bit transferred from the register Za and a negative sign bit transferred from the register Zj to output a negative value.

In FIG. 12, the complex number A* is changed to the complex number C* due to an abnormal broadcasting receipt channel.

Referring to FIG. 12, it is assumed that the complex number A is "a+jb" and the complex number C* is "e+jf". The real part of the complex number A is 'a', and the imaginary part of the complex number A is 'b'. The real part of the complex number C* is 'e', and the imaginary part of the complex number C* is T. In this case, the sign bit of the imaginary part of the complex number A is positive, and the sign bit of the imaginary part of the complex number C* is positive.

Referring to FIGS. 9 and 12, the register Za of the first imaginary sign bit multiplier 41_1 receives the sign bit of the imaginary part of the complex number A. The register Zj of the first imaginary sign bit multiplier 41_1 receives the sign bit of the imaginary part of the complex number C* from the register Zi. The XOR gate of the first imaginary sign bit multiplier 41_1 performs an XOR operation on a positive sign bit transferred from the register Za and a positive sign bit transferred from the register Zj to output a positive value.

Returning to FIG. 8, the imaginary/real correlation outputter 42 receives the sign bits of the imaginary and real parts of the complex numbers which are included in the cyclic prefix. The imaginary/real correlation outputter 42 multiplies the sign bits of the imaginary parts of the complex numbers and sums the multiplication results. The imaginary/real correlation outputter 42 multiplies the sign bits of the real parts of the complex numbers, and inverts the multiplication results to sum the inverted multiplication results. The imaginary/real correlation outputter 42 sums the two sum results to output the correlation. The imaginary/real correlation outputter 42 will be described in detail below with reference to FIG. 13.

Figure 13:
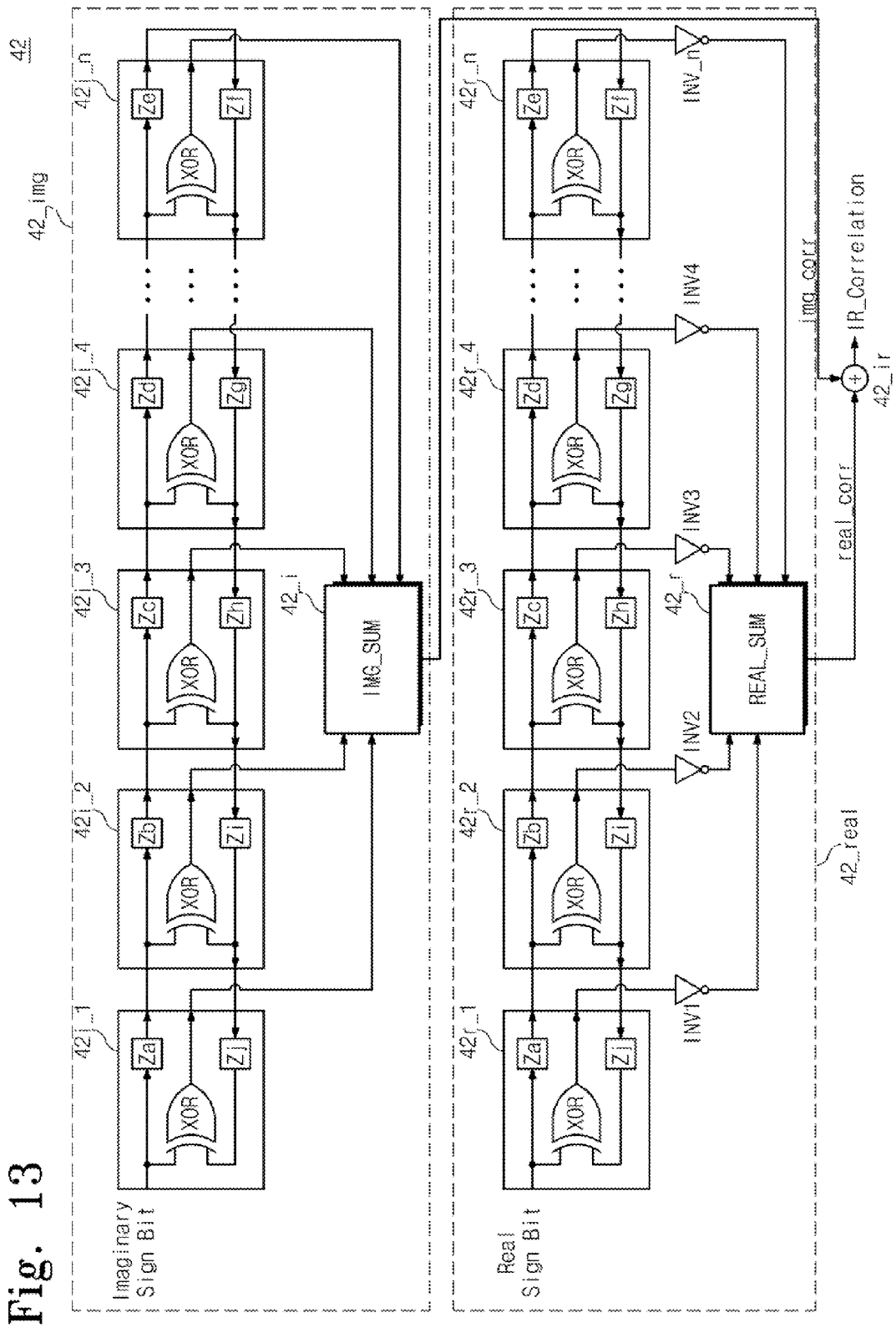
FIG. 13 is a block diagram illustrating the imaginary/real correlation outputter in FIG. 8.

FIG. 13 is a block diagram illustrating the imaginary/real correlation outputter in FIG. 8.

Referring to FIG. 13, the imaginary/real correlation outputter 42 includes an imaginary correlation outputter 42_img and a real correlation outputter 42_real. The imaginary correlation outputter 42_img includes first to $n^{th}$ imaginary sign bit multipliers 42i_1 to 42i_n (42i_1, 42i_2, 42i_3, 42i_4, ..., 42i_n) and an imaginary adder 42_i.

The imaginary correlation outputter 42_img and the imaginary correlation outputter 41 of FIG. 9 have the same structure and operation principle. Accordingly, the description of the imaginary correlation outputter 41 will be applied to the imaginary correlation outputter 42_img. The imaginary correlation outputter 42_img sums all the XOR-operation results of the XOR gates of the first to $n^{th}$ imaginary sign bit multipliers 42i_1 to 42i_n to output an imaginary correlation img_corr.

The real correlation outputter 42_real includes first to $n^{th}$ real sign bit multipliers 42r_1 to 42r_n (42r_1, 42r_2, 42r_3, 42r_4, ..., 42r_n) and a real adder 42_r.

The first to $n^{th}$ real sign bit multipliers 42r_1 to 42r_n have the same structure and operation principle. Accordingly, the description of the first real sign bit multiplier 42r_1 will be applied to the second to $n^{th}$ real sign bit multipliers 42r_2 to 42r_n.

The first real sign bit multiplier 42r_1 includes two registers Za and Zj, and one XOR gate.

The register Za receives the sign bit of the real part and shifts the received sign bit to the register Zb. The register Za transfers the sign bit of the real part to the XOR gate. The register Zi shifts the sign bit of the real part to the register Zj. The register Zj transfers the sign bit of the real part to the XOR gate.

The registers Za to Zj are configured with a shift register for shifting the sign bit of the real part. That is, the register Za of the first real sign bit multiplier 42r_1 shifts the sign bit of the real part to the register Zb of the second real sign bit multiplier 42r_2. The register Zb of the second real sign bit multiplier 42r_2 shifts the sign bit of the real part to the register Zc of the third real sign bit multiplier 42r_3. Subsequently, the register Zc of the third real sign bit multiplier 42r_3 shifts the sign bit of the real part to the register Zd of the fourth real sign bit multiplier 42r_4.

The XOR gate of the first real sign bit multiplier 42r_1 performs an XOR operation on the sign bits of the real part transferred from the registers Za and Zj. The XOR gate transfers the XOR-operation result to a first inverter INV1. The first inverter INV1 inverts the output of the XOR gate and transfers the inversion result to the real adder 42__r. The real adder 42__r inverts all the XOR-operation results of the XOR gates of the first to $n^{th}$ real sign bit multipliers 42r_1 to 42r__n and sums the inverted results. The sum result of the real adder 42__r is the real correlation real_corr.

An imaginary/real adder 42__ir sums the imaginary correlation img_corr and the rear correlation real_corr to output an imaginary/real correlation IR_correlation.

Returning to FIG. 8, the first multiplexer 43 outputs one of signals inputted from the imaginary correlation outputter 41 and the imaginary/real correlation outputter 42 according to the selection signal Sel. When calculating only the sign bit of the imaginary part, the first multiplexer 43 connects the imaginary correlation outputter 41 to the subtractor 45. When calculating the sign bits of the imaginary and real parts, the first multiplexer 43 connects the imaginary/real correlation outputter 42 to the subtractor 45.

When calculating only the sign bit of the imaginary part or the sign bits of the imaginary and real parts, the OFDM receiver, according to exemplary embodiments of the present invention, limits the magnitude of the correlation to the range of an average value for obtaining a certain magnitude of correlation. For example, if an XOR operation on an arbitrary binary digit (e.g., 0 or 1) is performed N times, an average value is 'N/2'.

The second multiplexer 44 outputs one-half (e.g., N/4) of the average value or the average value (e.g., N/2) to the subtractor 45 according to the selection signal Sel. When calculating only the sign bit of the imaginary part, the second multiplexer 44 transfers the average value (e.g., N/2) to the subtractor 45. When calculating the sign bits of the imaginary and real parts, the second multiplexer 44 transfers one-half (e.g., N/4) of the average value to the subtractor 45.

The subtractor 45 performs a subtraction operation on the output of the imaginary correlation outputter 41 or the imaginary/real correlation outputter 42 and the output of the second multiplexer 45. The subtraction result of subtractor 45 is outputted as a negative integer or a positive integer.

The absolute value converter 46 converts the output of the subtractor 45 into an absolute value.

The average filter 47 performs filtering to search the maximum value of the correlation within a predicted time range for calculating more accurate time synchronization.

The maximum value extractor 48 outputs time information corresponding to the maximum value from the output of the average filter 46. The time information corresponding to the maximum value is the symbol sync signal Syn.

In the case of a single symmetric structure, since the number of peaks is one, the maximum value extractor 48 may more easily calculate the maximum value. As illustrated in FIGS. 6 and 7, however, a plurality of peaks may exist in the case of the prefix having a dual-symmetric structure. The maximum value extractor 48, therefore, extracts the greatest value of the peaks.

The symbol synchronizer 40 calculates the correlation by using the sign bits of the imaginary parts of the complex numbers constituting the prefix. The symbol synchronizer 40, moreover, calculates the correlation by using the sign bits of the imaginary and real parts of the complex numbers that constitute the prefix. The symbol synchronizer 40 extracts the time sync signal of the image data by using the calculated correlation.

According to exemplary embodiments of the present invention, since the OFDM receiver uses only the sign bit of the complex number that constitute the prefix, it can reduce the overhead of hardware for calculating the correlation.

Moreover, the OFDM receivers, according to exemplary embodiments of the present invention, calculate only the sign bit, and thus, can reduce the computational resources needed to extract the fast time sync signal.

The OFDM receivers according to exemplary embodiments of the present invention calculate the correlation by using only the sign bit of the complex number constituting the prefix, reducing the overhead of the hardware for extracting the time sync signal.

The above-disclosed subject matter is to be considered illustrative, and not restrictive, and the appended claims are intended to cover all modifications, enhancements, and other embodiments.

What is claimed is:

1. An Orthogonal Frequency Division Multiplexing (OFDM) receiver, comprising:
   a receiving unit for receiving a plurality of symbols, each symbol comprising data and a prefix; and
   a symbol synchronizer generating a time sync signal for the data from the prefix,
   wherein:
   the prefix comprises a plurality of complex numbers, and
   the symbol synchronizer generates the time sync signal from the prefix by using only the sign bits of the complex numbers of the prefix.

2. The OFDM receiver of claim 1, wherein the receiving unit comprises an antenna, an analog-to-digital converter, and a low-pass filter.

3. The OFDM receiver of claim 1, wherein the data comprises image data and the received plurality of symbols were transmitted by digital broadcasting.

4. The OFDM receiver of claim 1, wherein:
   the complex numbers each comprise a real part and an imaginary part, and
   the symbol synchronizer generates the time sync signal by using the sign bit of the imaginary part of the complex numbers.

5. The OFDM receiver of claim 1, wherein a first symbol of the plurality of symbols sequentially comprises a first instance of a first prefix, a first data and a second instance of the first prefix.

6. The OFDM receiver of claim 5, wherein a second symbol of the plurality of symbols sequentially comprises a first instance of a second prefix, a second data and a second instance of the second prefix,
   wherein the first and second prefixes are symmetrical.

7. The OFDM receiver of claim 6, wherein the symbol synchronizer multiplies the sign bits of the imaginary parts of the complex numbers of the first prefix by the sign bits of the imaginary parts of the complex numbers of the second prefix, and sums the multiplication results to output correlation, wherein the sign bits of the imaginary parts of the complex numbers of the first prefix are symmetrical with respect to the sign bits of the imaginary parts of the complex numbers of the second prefix.

8. The OFDM receiver of claim 1, wherein:
   the complex numbers of the prefix comprise a real part and an imaginary part, and
   the symbol synchronizer generates the time sync signal by using the sign bits of the real and imaginary parts.

9. The OFDM receiver of claim 1, further comprising a fast Fourier transformer that receives the time sync signal generated by the symbol synchronizer and the symbols and performs a fast Fourier transform.

10. A method for receiving Orthogonal Frequency Division Multiplexing (OFDM) transmissions, comprising:
receiving a plurality of symbols, each symbol comprising data and a prefix; and
generating a time sync signal for the data from the prefix, wherein:
the prefix comprises a plurality of complex numbers, and
the time sync signal is generated from the prefix by using only the sign bits of the complex numbers of the prefix.

11. The method of claim 10, wherein the plurality of symbols are received by an antenna, an analog-to-digital converter, and a low-pass filter.

12. The method of claim 10, wherein the data comprises image data and the received plurality of symbols were transmitted by digital broadcasting.

13. The method of claim 10, wherein:
the complex numbers each comprise a real part and an imaginary part, and
the symbol synchronizer generates the time sync signal by using the sign bit of the imaginary part of the complex numbers.

14. The method of claim 10, wherein a first symbol of the plurality of symbols sequentially comprises a first instance of a first prefix, a first data and a second instance of the first prefix.

15. The method of claim 14, wherein a second symbol of the plurality of symbols sequentially comprises a first instance of a second prefix, a second data and a second instance of the second prefix,
wherein the first and second prefixes are symmetrical.

16. The method of claim 15, wherein the sign bits of the imaginary parts of the complex numbers of the first prefix are multiplied by the sign bits of the imaginary parts of the complex numbers of the second prefix, and the multiplication results are summed to output a correlation, wherein the sign bits of the imaginary parts of the complex numbers of the first prefix are symmetrical with respect to the sign bits of the imaginary parts of the complex numbers of the second prefix.

17. The method of claim 10, wherein the complex numbers of the prefix comprise a real part and an imaginary part, and
the time sync signal is generated using the sign bits of the real and imaginary parts.

18. The method of claim 10, wherein a fast Fourier transform is performed on the generated time sync signal.

19. A method for receiving digital television transmissions transmitted in accordance with Orthogonal Frequency Division Multiplexing (OFDM), comprising:
receiving the digital television transmission signal comprising a plurality of symbols, each symbol comprising data and a prefix; and
generating a time sync signal for the data from the prefix, wherein:
the prefix comprises a plurality of complex numbers, and
the time sync signal is generated from the prefix by using only the sign bits of the complex numbers of the prefix.

* * * * *